(12) United States Patent
Poupon et al.

(10) Patent No.: US 10,900,517 B2
(45) Date of Patent: Jan. 26, 2021

(54) DRY FRICTION SLIDE WITH INCLINED CONTACT SURFACES

(71) Applicant: Airbus Operations S.A.S., Toulouse (FR)

(72) Inventors: Cédric Poupon, Colomiers (FR); Laurent Cazeaux, Toulouse (FR)

(73) Assignee: Airbus Operations S.A.S.

( * ) Notice: Subject to any disclaimer, the term of this patent is extended or adjusted under 35 U.S.C. 154(b) by 0 days.

(21) Appl. No.: 16/654,151

(22) Filed: Oct. 16, 2019

(65) Prior Publication Data

US 2020/0124090 A1   Apr. 23, 2020

(30) Foreign Application Priority Data

Oct. 22, 2018   (FR) ..................... 18 71252

(51) Int. Cl.
*F16C 29/02*   (2006.01)
*B64C 9/02*   (2006.01)
*B64C 13/30*   (2006.01)

(52) U.S. Cl.
CPC .............. *F16C 29/02* (2013.01); *B64C 9/02* (2013.01); *B64C 13/30* (2013.01)

(58) Field of Classification Search
CPC .... F16C 29/005; F16C 29/02; F16C 2229/00; F16C 2233/00; B64C 9/02
USPC ........................................................ 384/42
See application file for complete search history.

(56) References Cited

U.S. PATENT DOCUMENTS

| | | | |
|---|---|---|---|
| 4,773,769 A | 9/1988 | Church | |
| 4,944,606 A * | 7/1990 | Lindsey | F16C 33/20 384/42 |
| 5,599,107 A * | 2/1997 | Wireman | B23Q 1/26 384/57 |
| 5,704,716 A * | 1/1998 | Jantunen | E21B 19/08 384/41 |
| 7,896,099 B2 * | 3/2011 | Saf | E21B 19/08 173/141 |
| 2015/0060607 A1 * | 3/2015 | Havar | B64C 3/54 244/213 |
| 2019/0360525 A1 * | 11/2019 | Shih | F16C 29/084 |

FOREIGN PATENT DOCUMENTS

| | | |
|---|---|---|
| DE | 19609596 A1 | 9/1997 |
| FR | 1261540 A | 5/1961 |

\* cited by examiner

*Primary Examiner* — Phillip A Johnson
(74) *Attorney, Agent, or Firm* — Lerner, David, Littenberg, Krumholz & Mentlik, LLP

(57) ABSTRACT

A slide includes a carriage, a guide, and interposed pads allowing the carriage to be moved in translation in a longitudinal direction by relative sliding of the pads on contact surfaces distributed symmetrically on both sides of two planes: a horizontal plane parallel to the longitudinal direction and the transverse direction and a median plane parallel to the longitudinal direction and the vertical direction. The contact surfaces are oriented so as to form with the horizontal plane an angle between 30° and 70° inclusive.

19 Claims, 3 Drawing Sheets

DRY FRICTION SLIDE WITH INCLINED CONTACT SURFACES

FIELD OF THE INVENTION

The present invention concerns the field of dry friction slides. Dry friction slides are mechanical devices enabling a sliding connection to be produced, that is to say a mechanical connection allowing only movement in translation in the direction of the connection.

BACKGROUND OF THE INVENTION

Among known slide technologies, dry friction slides are distinguished from so-called rolling element slides, for example ball slides, in that they employ the rubbing of pads on a contact surface to enable the movement in translation and in particular guiding thereof.

They have the advantage of being able to function correctly, reliably, in the presence of contaminants, for example in the presence of abrasive dust or potentially aggressive fluid.

Slides of this kind are routinely used in numerous industrial fields, in particular for aeronautical applications.

One example of an application concerns guiding mechanisms controlling reversing flaps in a bypass turbojet engine. This example is expanded on hereinafter to illustrate the aspects of the invention. Aspects of the invention are nevertheless applicable to any dry friction slide.

However, a dry friction slide has the disadvantage that the pads that it employs can wear progressively in a not particularly homogeneous manner. This is because of a distribution of pressure on the pads that is not homogeneous, and commensurately increases the wear of the most heavily loaded pads.

BRIEF SUMMARY OF THE INVENTION

Aspects of the present invention propose a dry friction slide, in particular a slide for aeronautical use, solving the problems of reliability linked to potentially irregular progressive wear of the pads of the slide.

The invention therefore relates to friction slide including a carriage, a guide extending in a longitudinal direction, and pads disposed between the carriage and the guide so as to enable movement in translation of the carriage in the longitudinal direction by relative sliding of the pads on plane contact surfaces of the carriage or of the guide, whilst maintaining said carriage fixed in a transverse direction and in a vertical direction. The longitudinal direction, the transverse direction and the vertical direction are mutually orthogonal. The contact surfaces are symmetrically distributed on respective opposite sides of two planes, namely a horizontal plane parallel to the longitudinal direction and the transverse direction and a median plane parallel to the longitudinal direction and the vertical direction. The carriage fits tightly around the guide in the vertical direction. The contact surfaces are oriented so as to form with said horizontal plane an angle between 30° and 70° inclusive.

The contact surfaces therefore have an orientation enabling generation as a reaction to the stresses to which the carriage of the slide is subjected of a bearing force having a vertical component and a transverse component. This enables improved, more homogeneous distribution of the contact pressures compared to a conventional slide including distinct pads to absorb vertical forces and transverse forces. Moreover, the wear of the pads is more regular between the pads in that a vertical force or a transverse force exerted on the carriage is transferred to at least two pads of the slide and the reaction force generated in the slide tends to recenter the carriage in its guide.

The contact surfaces may be four in number.

The guide may include two parallel longitudinal rails.

The carriage may include an upper part and a lower part interconnected by connecting means configured to exert a prestressing force in the vertical direction tending to move the upper part and the lower part toward one another, the guide being disposed between said upper part and said lower part.

The upper part and the lower part may be symmetrical in said horizontal plane.

The slide may include a sensor for measuring the force or characterizing the evolution of the prestressing force.

The upper part and the lower part may be interconnected by at least one screw or a pin, the screw or the pin being of the instrumented type so as to form a force sensor or being equipped with a washer type force sensor.

The connecting means may be equipped with a prestressing spring, for example a spring washer.

The contact surfaces may be oriented to form with said horizontal plane an angle of approximately 45°.

The invention also relates to a mechanism including a slide as defined above for actuating a mobile flap of an aircraft.

Other particular features and advantages of the invention will become more apparent in the following description.

BRIEF DESCRIPTION OF THE DRAWINGS

In the appended drawings, provided by way of nonlimiting example.

DETAILED DESCRIPTION

Figure 1:
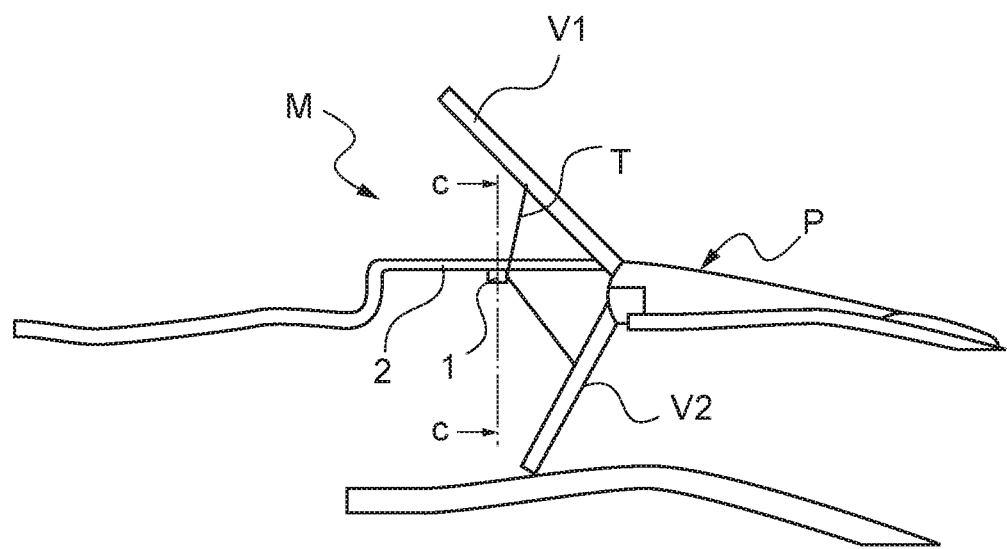
FIG. 1 represents in a two-dimensional theoretical diagram one example of application of a dry friction slide.

FIG. 1 represents a set of flaps employed in a thrust reverser device equipping an aircraft propulsion unit. The set represented includes a first flap V1 and a second flap V2 that can be conjointly positioned either in a closed position (not represented) in which they are aligned with the wall P of a nacelle of the propulsion unit or in an open position in which the flaps uncover openings in the nacelle orienting some of the secondary flow of the propulsion unit outwards and rearwards.

An actuating mechanism M enables the flaps V1, V2 to be moved from the closed position to the open position and vice-versa. The actuating mechanism includes a tie-rod T per flap, each tie-rod being rotationally connected at one of its ends to a flap and at the other of its ends to the carriage 1 of a slide. The carriage 1 is configured to be moved along a guide 2 in accordance with the very operating principle of a slide. In this instance the guide 2 is a straight linear guide along which the carriage 1 is able to move in translation.

By convention, it is considered in the whole of the present document that the carriage is mobile in a so-called longitudinal direction (x) which is the general direction in which the guide 2 extends. A three-dimensional orthogonal system of axes is formed, further defining the longitudinal direction (x), a transverse direction (y) and a direction conventionally termed the vertical direction (z).

Movement of the carriage 1 of the slide therefore concomitantly opens or closes the flaps V1, V2.

Figure 2:
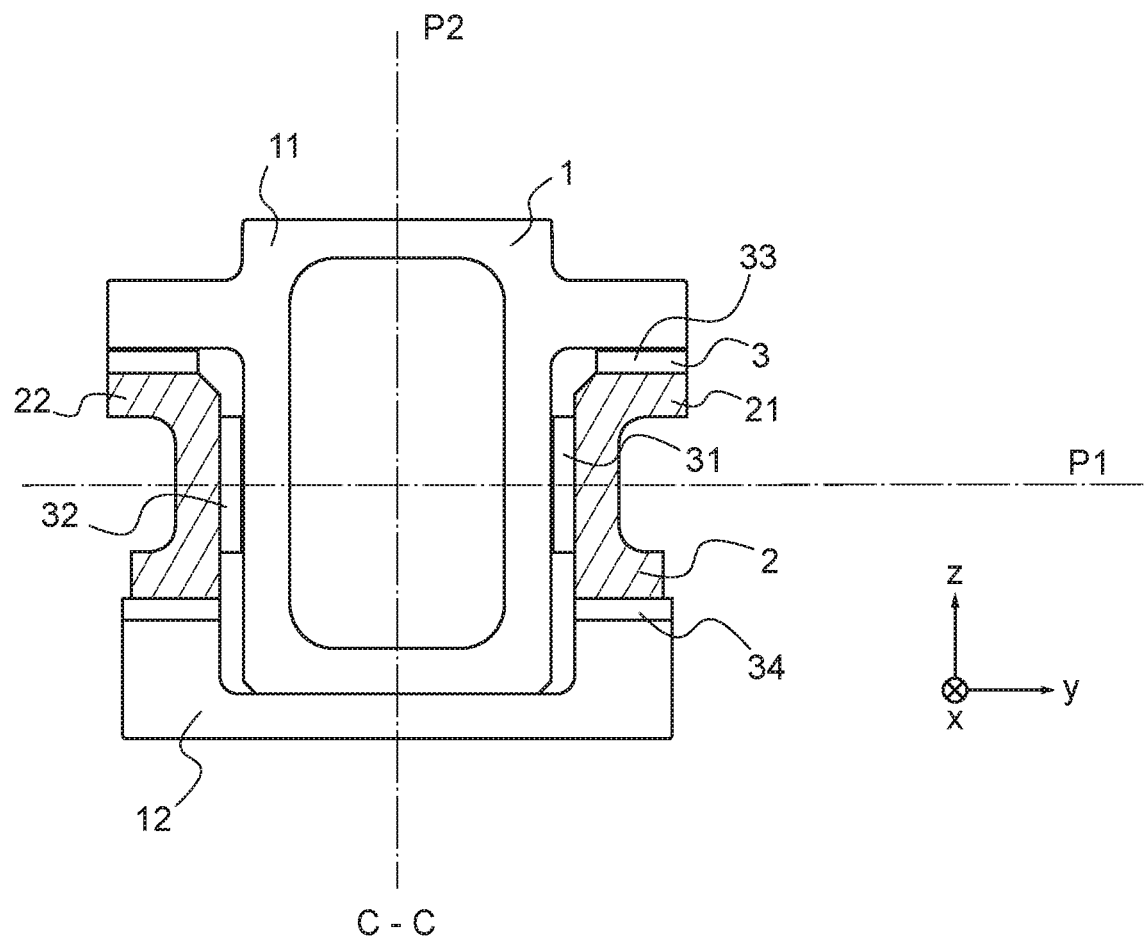
FIG. 2 represents in diagrammatic cross section a prior art dry friction slide.

This function is conventionally exercised by means of a conventional slide, for example a slide such as represented in FIG. 2 and described in more detail hereinafter. Given that very high reliability is required of an actuating mechanism M of this kind, this mechanism constitutes a privileged application for a slide conforming to the present invention. A slide conforming to the invention may nevertheless have numerous other applications, in particular in the aeronautical field. It may for example be employed in any mechanism for actuating flaps. By flap is meant any external mobile surface of the aircraft, such as a hatch or a control system of the aircraft. A slide conforming to the invention may advantageously replace any conventional dry friction slide, or even any slide of any type.

FIG. 2 represents in diagrammatic sectional view (taken along the line C-C in FIG. 1) one example of a prior art dry friction slide. The slide includes a carriage 1 and a guide 2. The guide 2 includes a pair of parallel rails, namely a first rail 21 and a second rail 22. The carriage 1 is retained transversely between the first rail 21 and the second rail 22. The carriage 1 fits tightly around the guide 2 in the vertical direction. The carriage 1 is therefore held fixed in the transverse direction (y) and in the vertical direction (z) relative to the guide 2. On the other hand, longitudinal movement in translation of the carriage 1 relative to the guide 2 is possible, over all or part of the length of said guide 2. In order to enable good retention of the carriage 1 in the transverse direction (y) and in the vertical direction (z), with a small clearance relative to the guide, and also to enable easy movement in translation of the carriage in the longitudinal direction (x), pads 3 are disposed between the carriage 1 and the guide 2.

In the example represented the carriage 1 includes an upper part 11 and a lower part 12.

The pads 3 are advantageously formed of a self-lubricating material relatively insensitive to wear through friction. Numerous materials may be envisaged, in particular metals or metal alloys (bronze, copper, brass, etc.), materials based on graphite or charged with graphite, plastic materials (nylon, acetal, polytetrafluoroethylene), or any material coated with a self-lubricating coating.

The pads 3 are connected to the carriage 1 or to the guide 2 or disposed freely between the carriage 1 and the guide 2. Each pad 3 has a surface that is intended to bear on a contact surface on which the pad 3 is able to slide. The contact surface corresponding to each of the pads 3 may therefore be a surface of the carriage 1 or a surface of the guide 2.

In the example represented here the slide includes six pads symmetrically distributed in two planes, namely a horizontal plane P1 parallel to the longitudinal direction (x) and the transverse direction (y) and a median plane P2 parallel to the longitudinal direction (x) and the vertical direction (z), the first rail 21 and the second rail 22 being equidistant from the median plane P2.

A first pad 31 is disposed between the carriage 1 and a vertical contact surface of the first rail 21. A second pad 32 is disposed between the carriage 1 and a vertical contact surface of the second rail 22. The carriage 1 is therefore retained in the transverse direction (y).

A third pad 33 is disposed between the carriage 1 and a first horizontal contact surface of the first rail 21. A fourth pad 34 is disposed between the carriage 1 and a second horizontal contact surface of the first rail 21, the contact surfaces having opposite orientations. The carriage 1 is therefore retained in the vertical direction (z). Two other pads are disposed in a similar manner, symmetrically with respect to the median plane P2.

In a corollary manner the carriage is retained in rotation.

The slide is generally oriented so that in use, in addition to longitudinal stresses, the carriage is subjected to essentially vertical stresses. It is nevertheless sometimes impossible to obtain a homogeneous distribution of the forces between the pads 3, in particular a symmetrical distribution. This can result in premature wear of the most loaded pads 3 (compared to the other pads). In this case the mechanical clearances between the worn pad and the corresponding contact surface increase. High wear limits the accuracy of the guidance of the carriage 1 and the reliability of the slide may be compromised. Firstly, hard spots may appear, that is to say positions of the slide in which the force necessary for the movement in translation of the carriage varies. In extreme situations, in particular if the wear of the pads is not even, the slide may jam because of wedging of the carriage 1 against the guide 2.

Even before such phenomena occur, the pads—or the slide—must be replaced. The wear of the pads therefore leads to the corollary problem of monitoring that wear and the correct operation of the slides.

Figure 3:
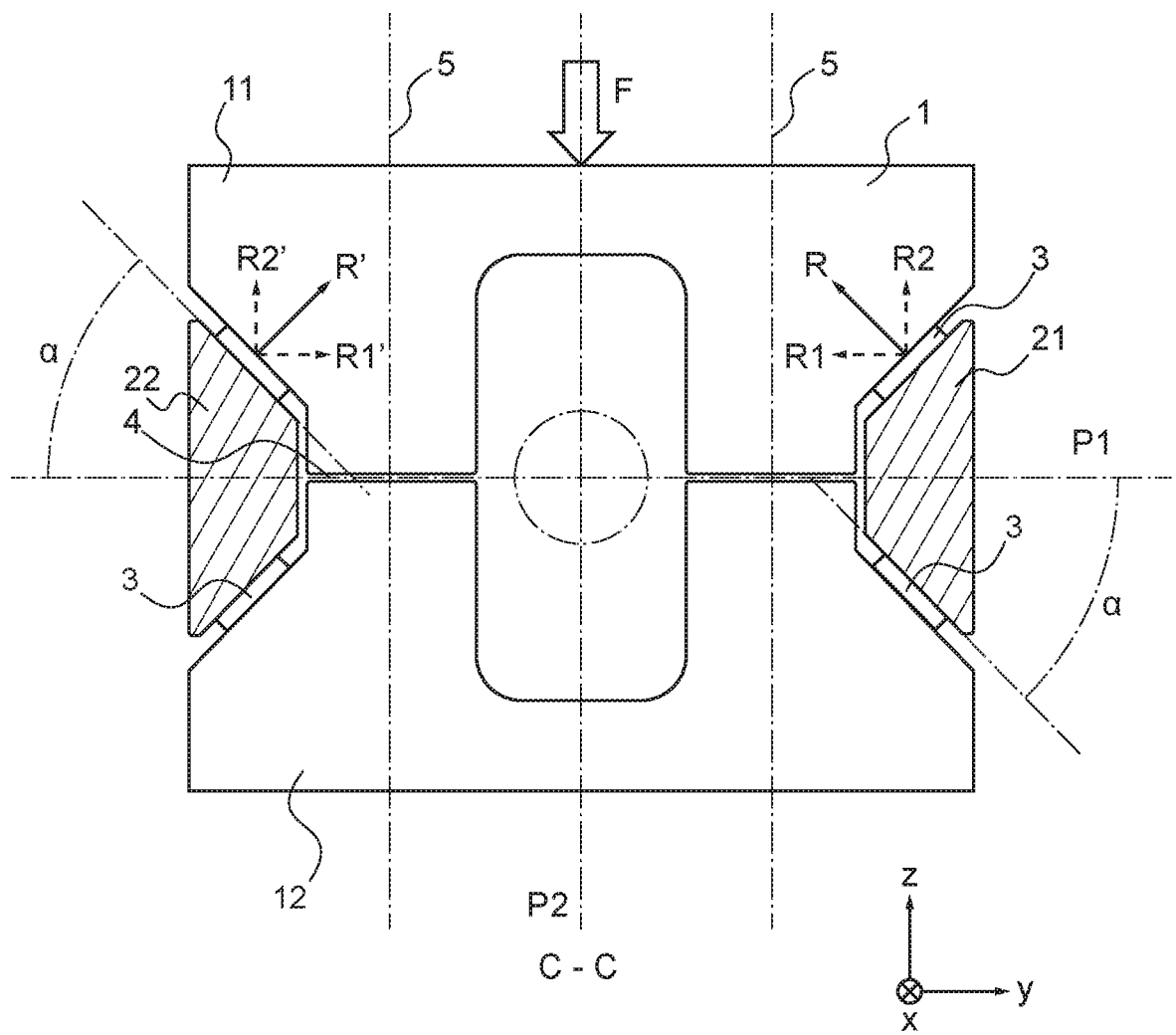
FIG. 3 represents a dry friction slide conforming to one embodiment of the invention in a diagrammatic sectional view analogous to that of FIG. 2.

FIG. 3 represents a slide conforming to one embodiment of the invention in a diagrammatic sectional view analogous to that of FIG. 2.

Just like the slide represented in FIG. 2, a carriage 1 is intended to be moved in translation along a guide 2 including a first rail 21 and a second rail 22.

Pads 3 are disposed between the carriage 1 and the guide 2. The pads 3 may have a constitution similar to that of the pads described with reference to FIG. 2. They may optionally be connected to the carriage 1 or to the guide 2. The pads 3 are moreover in contact with a contact surface of the guide 2 or of the carriage 1 on which they slide during movement in translation of the carriage 1. In the embodiment represented the pads are connected to the carriage 1 and the contact surfaces are provided on the rails 21, 22 of the guide 2.

In this embodiment the slide includes four pads 3. The slide that is the subject matter of the invention may have more than four pads in the section plane C-C. The slide that is the subject matter of the invention may include a plurality of sets of pads distributed longitudinally between the carriage and the guide 2. For example, pads distributed in a similar manner to the distribution shown in FIG. 3 may be present in a plurality of longitudinally distributed transverse section planes of the slide.

The pads 3 are symmetrically distributed with reference to the horizontal plane P1 and the median plane P2.

The slide is moreover configured so that the contact surfaces are oriented relative to the horizontal plane P1 at an angle $\alpha$ between 30° and 70° inclusive. The slopes formed by the contact surfaces are advantageously oriented toward the interior of the slide, that is to say in the direction of the median plane P2, or, in the example represented, between the two rails 21, 22. Each of the rails 21, 22 may therefore have a substantially trapezoidal cross section (the shorter base of the trapezium being parallel to the median plane P2 and nearer the median plane than its longer base).

The presence of an angle of this kind enables a more homogeneous distribution of the stresses in the slide. For example, there has been represented a force F exerted vertically on the carriage 1. An orientation of this kind is representative of the orientation of the majority forces generally exerted in the slide when operating (in addition to the longitudinal force that enables the movement of the carriage). The force F will be taken up at the level of the inclined contact surfaces. This results in a reaction force opposite and equal to the force F that is the resultant of a first reaction force R orthogonal to the contact surface of the first rail 21 and a second reaction force R' orthogonal to the contact surface of the second rail 22. To obtain equilibrium between the force F and the reaction forces R, R' the reaction force R includes a transverse component $R_1$ that is equal and opposite to a transverse component $R_1'$ of R' and the reaction force R includes a vertical component $R_2$ that is added to a vertical component $R_2'$ of R' so that the vertical resultant opposes and cancels out the force F.

The effect of the transverse components $R_1$ and $R_1'$ is to recenter the carriage relative to the median plane P2, which moreover guarantees that R and R' have the same value (that is to say at the same modulus in a classic force vector diagram).

The example above corresponds to a vertical force F exerted in the middle of the carriage 1, both transversely and longitudinally. If the force F is exerted in a different direction and/or with a component tending to tilt the carriage 1 (for example about an axis oriented in the transverse direction (y) or the longitudinal direction (x)), the stresses are distributed between the four pads of the slide in accordance with the reaction force to be opposed to the force F.

In accordance with a configuration enabling the most homogeneous possible distribution of the stresses in a majority of situations (that is to say with diverse applied stresses), a 45° orientation of the contact surfaces relative to the horizontal plane P1 may be used.

The carriage 1 includes two parts, namely an upper part 11 and a lower part 12. The qualifiers "upper" and "lower" are adopted in that these parts are distributed in the vertical direction (z) but in no way prejudices the orientation in space of the slide. In the example represented here, the upper part 11 and the lower part 12 are symmetrical relative to the horizontal plane P1.

The upper part 11 and the lower part 12 are rigidly interconnected by connecting means of a type known in the prior art, such as screws 5 (conventionally represented by a chain-dotted line in FIG. 3) or pins. When the upper part 11 and respectively the lower part 12 are configured so that when they bear on the guide 2 via the pads 3 a residual space 4 exists between them. This enables prestressing to be exerted in the device so that the carriage 1 fits tightly around the rails 21, 22 of the guide 2 with said prestress. The prestress corresponds to a force in the vertical direction tending to move the upper part 11 and the lower part 12 toward one another. The prestress creates reaction forces to the prestress at the level of the contact surfaces. The reaction forces to the prestress balance out and tend to center the carriage 1 in the median plane P2 and therefore relative to the horizontal plane P1. The prestress therefore cancels any mechanical clearance in the slide and also contributes to the homogeneous distribution in the pads 3 of the slide of the stresses exerted on the carriage 1.

A slide constructed in this manner further has an important advantage where controlling and monitoring the wear of the pads is concerned. In that wear is relatively even between the pads, measurement of the prestressing force and more particularly its evolution is a highly pertinent indicator of the wear of the pads. Thus wear of the pads will allow a slight movement toward one another of the upper part 11 and the lower part 12, which relieves the tension (created by elastic deformation) in the screw 5 and commensurately reduces the prestress.

To measure the stress force or its evolution, at least one of the screws (or other connecting means employed between the parts of the carriage 1) may be instrumented. In particular, an instrumented type screw includes a sensor enabling characterization of the mechanical tension in the screw, which corresponds to the force that the screw exerts on the parts that it connects.

Other sensors may be employed instead, for example a washer type force sensor. A sensor of this kind is disposed between a screwhead and a part of the assembly assembled by said screw (or instead between a nut mounted on a screw or a pin and a part of the assembly assembled by said pin).

Moreover, it is advantageous to maintain a prestress value in an adequate range while the wear of the pads is not excessive. Too high a prestress when the system is new increases the friction and therefore favors wear, but too low a prestress could result in the appearance of clearances in the slide or in difficulty in characterizing the reduction of said prestress. In order to compensate the wear of the pads when it remains acceptable (that is to say without risk to the correct operation of the slide), it is therefore advantageous to guarantee some elasticity in the connection means employed between the upper part 11 and the lower part 12. Firstly, appropriate connecting means may be employed (for example screws or pins having an appropriate modulus of elasticity). Instead of or in addition to this, the connecting means may be equipped with a prestressing spring. The prestressing spring may in particular take the form of a spring washer, of a type known in the prior art.

The invention as developed in this way firstly enables a reliable dry friction slide to be obtained in which the wear of the pads is regular and even despite potentially irregular mechanical loads. The risk of serious failure of the slide is moreover reduced. Thanks to its particular configuration, a slide conforming to the invention favors easy and/or automated monitoring of the wear of the pads. Like any dry friction slide, the subject matter of the invention is adapted to function in aggressive environments or in the presence of contaminants.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A friction slide comprising:
   a carriage;
   a guide extending in a longitudinal direction; and
   a plurality of pads disposed between the carriage and the guide so as to enable movement in translation of the carriage in the longitudinal direction by relative sliding of the pads on plane contact surfaces of the carriage or of the guide, whilst maintaining said carriage fixed in a transverse direction and in a vertical direction, each of the plurality of pads comprising a plane contact surface configured to be in surface contact with corresponding plane surfaces of the carriage or of the guide, wherein the longitudinal direction, the transverse direction and the vertical direction are mutually orthogonal, wherein the contact surfaces are symmetrically distributed on respective opposite sides of two planes, namely a horizontal plane parallel to the longitudinal direction and the transverse direction and a median plane parallel to the longitudinal direction and the vertical direction, and wherein the carriage fits around the guide in the vertical direction and the contact surfaces are oriented so as to form with said horizontal plane an angle between 30° and 70° inclusive.

2. The slide as claimed in claim 1, wherein the contact surfaces are four in number.

3. The slide as claimed in claim 1, wherein the guide includes two parallel longitudinal rails.

4. The slide as claimed in claim 1, wherein the carriage includes an upper part and a lower part interconnected by connecting means configured to exert a prestressing force in the vertical direction tending to move the upper part and the lower part toward one another, wherein the guide is disposed between said upper part and said lower part.

5. The slide as claimed in claim 4, wherein the upper part and the lower part are symmetrical relative to said horizontal plane.

6. The slide as claimed in claim 4, further comprising a sensor for measuring the force or characterizing the evolution of the prestressing force.

7. The slide as claimed in claim 6, wherein the upper part and the lower part are interconnected by at least one screw or a pin, wherein the screw or the pin is of an instrumented type so as to form a force sensor or being equipped with a washer type force sensor.

8. The slide as claimed in claim 4, wherein the connecting means are equipped with a prestressing spring.

9. The slide as claimed in claim 1, wherein the contact surfaces are oriented so as to form with said horizontal plane an angle of approximately 45°.

10. A mechanism for actuating an aircraft mobile flap including a slide as claimed in claim 1.

11. A friction slide comprising:
a carriage;
a guide extending in a longitudinal direction; and
a plurality of pads disposed between the carriage and the guide so as to enable movement in translation of the carriage in the longitudinal direction by relative sliding of the pads on plane contact surfaces of the carriage or of the guide, whilst maintaining said carriage fixed in a transverse direction and in a vertical direction, wherein the longitudinal direction, the transverse direction and the vertical direction are mutually orthogonal, wherein the contact surfaces are symmetrically distributed on respective opposite sides of two planes, namely a horizontal plane parallel to the longitudinal direction and the transverse direction and a median plane parallel to the longitudinal direction and the vertical direction, and wherein the carriage fits around the guide in the vertical direction and the contact surfaces are oriented so as to form with said horizontal plane an angle between 30° and 70° inclusive, wherein the carriage includes an upper part and a lower part interconnected by connecting means configured to exert a prestressing force in the vertical direction tending to move the upper part and the lower part toward one another, wherein the guide is disposed between said upper part and said lower part.

12. The slide as claimed in claim 11, wherein the contact surfaces are four in number.

13. The slide as claimed in claim 11, wherein the guide includes two parallel longitudinal rails.

14. The slide as claimed in claim 11, wherein the upper part and the lower part are symmetrical relative to said horizontal plane.

15. The slide as claimed in claim 11, further comprising a sensor for measuring the force or characterizing the evolution of the prestressing force.

16. The slide as claimed in claim 15, wherein the upper part and the lower part are interconnected by at least one screw or a pin, wherein the screw or the pin is of an instrumented type so as to form a force sensor or being equipped with a washer type force sensor.

17. The slide as claimed in claim 11, wherein the connecting means are equipped with a prestressing spring.

18. The slide as claimed in claim 11, wherein the contact surfaces are oriented so as to form with said horizontal plane an angle of approximately 45°.

19. A mechanism for actuating an aircraft mobile flap including a slide as claimed in claim 11.

\* \* \* \* \*